(12) United States Patent
Lupton

(10) Patent No.: US 6,322,297 B1
(45) Date of Patent: Nov. 27, 2001

(54) GUIDANCE APPARATUS

(76) Inventor: George Lupton, "The Rowans" Hogshead Lane, Oaktree, Northwich (GB), CW8 2ET ( * ) Notice: Subject to any disclaimer, the term of this patent is extended or adjusted under 35 U.S.C. 154(b) by 0 days.

(21) Appl. No.: 09/359,976

(22) Filed: Jul. 23, 1999

(51) Int. Cl.$^7$ .................................................. B23B 39/00
(52) U.S. Cl. ............................ 408/110; 29/26 A; 29/560; 144/135.2; 408/20; 408/103
(58) Field of Search ..................... 144/135.2, 20; 408/95, 103, 110; 29/26 A, 560

(56) References Cited

U.S. PATENT DOCUMENTS

| | | | |
|---|---|---|---|
| 1,828,043 | | 10/1931 | Hedgpeth . |
| 3,295,414 | * | 1/1967 | Szwadowski ........................ 29/560 |
| 3,302,669 | | 2/1967 | Edler . |
| 3,719,987 | * | 3/1973 | Seidel ................................. 29/568 |
| 4,105,055 | * | 8/1978 | Brenta . |
| 4,265,283 | | 5/1981 | Nash et al. . |
| 4,572,715 | * | 2/1986 | Wolff . |
| 5,179,886 | | 1/1993 | Rathje . |
| 5,224,915 | * | 7/1993 | Killian ..................................... 483/1 |
| 5,351,376 | * | 10/1994 | Kitamura .............................. 29/27 C |
| 5,524,328 | * | 6/1996 | Hardesty ................................ 408/95 |
| 5,586,382 | * | 12/1996 | Ganem ................................... 29/560 |
| 5,634,250 | * | 6/1997 | Mihailovic .......................... 29/26 A |
| 5,647,420 | | 7/1997 | Michell . |
| 5,653,273 | | 8/1997 | Bach . |
| 5,807,035 | * | 9/1998 | Lewin .................................... 408/95 |

FOREIGN PATENT DOCUMENTS

| | | |
|---|---|---|
| 31 02 555 | 8/1982 | (DE) . |
| 2 689 806 | 10/1993 | (FR) . |
| 1 529 177 * | 10/1978 | (GB) . |
| 1 551 203 * | 8/1979 | (GB) . |
| 2 100 186 | 12/1982 | (GB) . |
| 2 276 114 * | 9/1994 | (GB) . |
| 2 287 207 * | 9/1995 | (GB) . |
| WO81/00370 * | 2/1981 | (WO) . |
| WO89/05714 * | 6/1989 | (WO) . |
| WO 98 18603 | 7/1998 | (WO) . |

\* cited by examiner

*Primary Examiner*—Allan N. Shoap
*Assistant Examiner*—Monica S. Carter
(74) *Attorney, Agent, or Firm*—Collard & Roe, P.C.

(57) ABSTRACT

The present invention provides a guidance apparatus (10) which, in use, is attached to a workbench (14), and which comprises a guidance member (12) which is adapted to receive at least one first carrier member (30) which can move along the length of the guidance member (12) and which can carry at least two different tool holders (60; 80) such that the guidance apparatus (10) can be used to guide at least two different tools to a desired position above a surface of a workpiece (24) upon which work is to be carried out.

9 Claims, 4 Drawing Sheets

GUIDANCE APPARATUS

The present invention relates to a guidance apparatus. More particularly, the present invention relates to a guidance apparatus which, in use, is attached to a support member, such as a workbench, and which assists in guiding a tool, such that the tool can be positioned at a desired location in relation to an object upon which work is to be carried out upon by the tool, such object hereinafter being referred to as a workpiece.

It is well known that a considerable amount of skill is required in order to manually provide a hole in a surface of an object which is at a precise location, at a precise angle, usually perpendicular to the surface of the workpiece, and to a known depth, using a portable drill, which may be electrically driven or otherwise.

With a view to addressing this problem, several drill stands, generally comprising a support pillar supporting a drill and its respective drill bit have been developed which, in use, enable the drill and its' respective drill bit to be moved vertically in relation to the surface of the workpiece wherein it is desired to provide a hole. Whilst such known drill stands ensure that the drilled hole is substantially vertical in relation to the surface of the workpiece, their use is somewhat limited, in that they are not specifically adapted for drilling a hole in any other direction, or orientation, other than substantially vertical in relation to the surface of the workpiece. Additionally, the distance by which a hole may be provided relative to the edge of the object is limited by the distance between the drill bit and the support pillar, i.e. such drill stands are not suitable for applications where a drilled hole is required at a distance from the edge of the workpiece which exceeds the distance between the drill bit and the support pillar. Furthermore, and in order to hold the workpiece in place whilst drilling, a separate clamp member is required.

On an industrial scale, machine tool systems, sometimes known as "machine centers", have been developed to assist with the accurate drilling of a hole or holes in a workpiece. Such machine tool systems are particularly suitable for providing drilled holes in large workpieces, and generally comprise an electrically driven drill bit in conjunction with a movable working surface for moving the workpiece in relation to the drill bit, or a guide system to enable the electrically driven drill bit to be moved in relation to the secured workpiece. The problem associated with such machine tool systems is that they are expensive to manufacture, bulky and are not really suitable for the DIY enthusiast.

In addition, it is well known that a considerable amount of skill is required in order to manually cut a workpiece in a precise manner using a portable cutting tool, for example, a saw, electric or otherwise.

With a view to addressing this problem, electrically driven saws having a circular blade incorporating a rip fence guide which positions the cut relative to the edge of the workpiece have been provided. However, the problem associated with this type of electric saw is that the edge of the workpiece must have a straight edge to ensure a straight cut, and the distance between the edge and the cut is limited to the bar length of the rip fence guide, which is usually about 20 cm, i.e. such electrically driven saws are not suitable for providing a cut in a workpiece at a distance which exceeds the distance between the edge of the workpiece and the bar length of the rip fence guide. Furthermore, in order to hold the workpiece in position whilst cutting same, an additional clamp member is usually required.

With a view to overcoming this problem, several designs of workbenches incorporating an electrically driven saw have been provided. Generally, such workbenches comprise an electrically driven saw which is held in a fixed, inverted position such that the blade of same protrudes above a surface of the workbench. Additionally, such benches usually incorporate guides which assist in manually transporting the workpiece at a desired position relative to the blade of the saw. The problem associated with such workbenches is that they are bulky and expensive to manufacture.

According to the present invention there is provided a guidance apparatus which, in use, is attached to a workbench, characterised in that the guidance apparatus comprises a guidance member which is adapted to receive at least one first carrier member which can move along the length of the guidance member and which can carry at least two different tool holders.

The object of the present invention is to provide a guidance apparatus which is believed to address the problems outlined above. In particular, the guidance apparatus of the present application can be utilised to guide a large number of tools and hence, has more utility than known guidance systems which are only adapted to guide one type of tool in relation to a workpiece. Additionally, the guidance apparatus of the present application can also act as a clamp and therefore, dispenses with the need to utilise a separate clamp, that is, if the action being carried out on the workpiece requires same to be secured to the workbench. Furthermore, the guidance apparatus of the present application is suitable for use at home and in the workplace. Moreover, the distance from the edge of a workpiece whereby a tool can be located by the guidance apparatus of the present invention is not believed to be limited by the design of same.

In a preferred embodiment, the guidance member is vertically displaceable relative to the workbench so that same can act as a clamp and can clamp a workpiece between the guidance member and the workbench. This has the advantage in that the guidance apparatus of the present invention, as well as being suitable to guide a tool to a desired position relative to a workpiece, can also act as a clamp and hence, forgoes the need for a separate clamp to be utilised.

Further preferably, the guidance apparatus of the present invention further comprises at least one second carrier member which carries a clamp or guide member which comprises an elongate member which is rotatably attached to the second carrier member. This has the advantage of enabling the clamp or guide member to be located at a desired angle of orientation in relation to the workpiece. Further preferably, the clamp or guide member is provided with an angular graduated scale plate which has the advantage of enabling the elongate member to be orientated at a specific angular orientation relative to the workpiece. Additionally, in a preferred embodiment, the elongate member is adapted so that same can be used to clamp or guide a rectangular, tubular or irregularly shaped workpiece. In a preferred embodiment, this is effected by providing a hinge adjacent an end of the elongate member.

Further preferably, at least one surface of the guidance member is graduated. This provides the advantage of being able to locate the first and/or second carrier member at a specific desired position in relation to the workpiece.

Further preferably, the first and/or second carrier members are provided with securing means such that the first and/or second carrier members can be secured at any position along the length of the guidance member. This provides the advantage in that the first and/or second carrier members and their respective tool carrier, or clamp or guide member, can be secured at a desired position in relation to the workpiece .

A preferred, non-limiting, embodiment of the present invention will now be described by way of example and with reference to the accompanying drawings in which.

Figure 1:
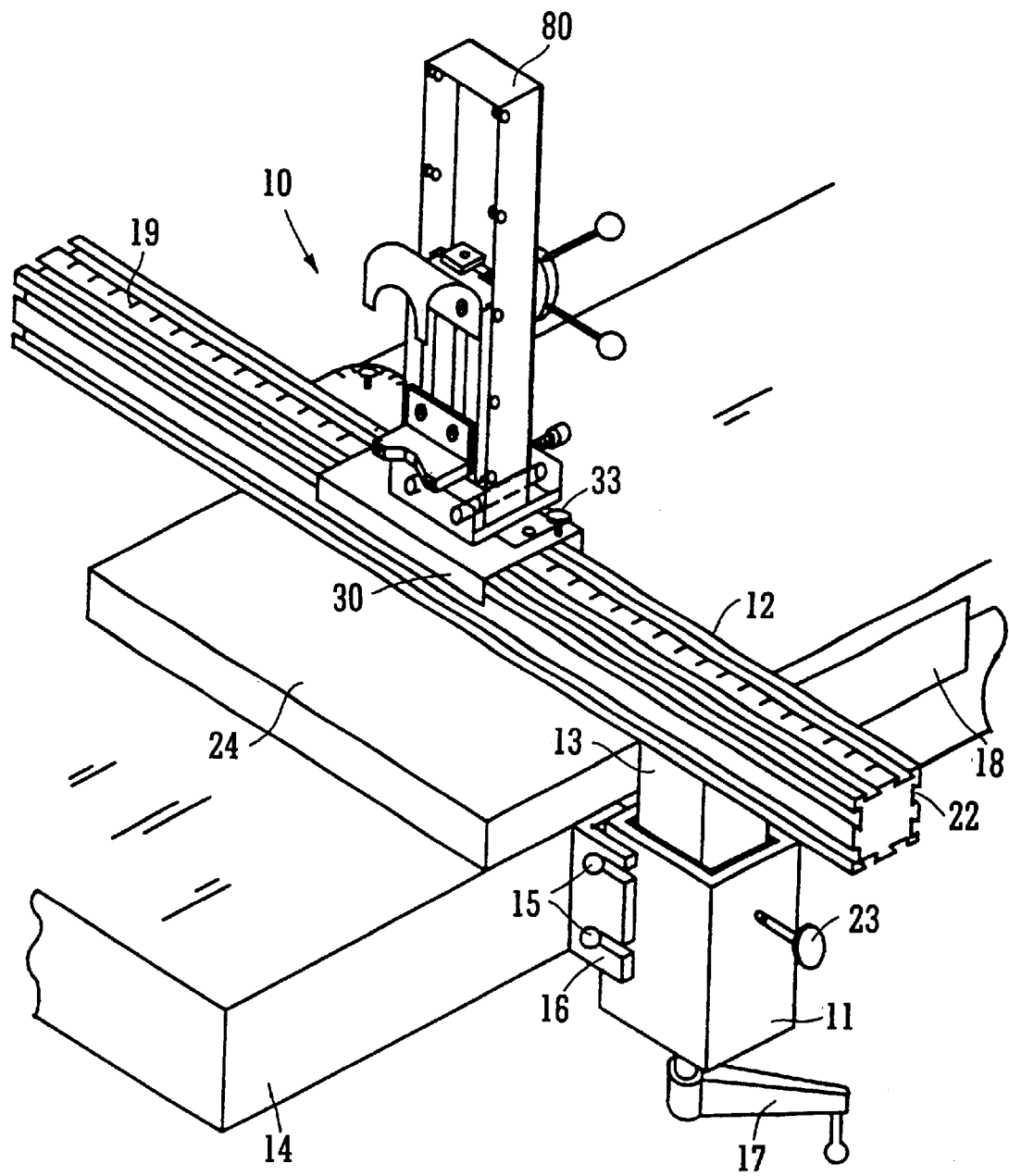
FIG. 1 shows, in perspective, a guidance apparatus in accordance with the present invention.

As illustrated in FIG. 1, a guidance apparatus 10 in accordance with the present invention, comprises a base member 11, within which is located a vertically displaceable support pillar 13 which is attached at one end thereof to a guidance member 12, preferably in the form of a guidance rail 12.

In use, the guidance apparatus 10 is attached to an edge of a workbench 14. In the illustrated embodiment, such attachment is effected between adjustable protruding members 15, located on either side of the base member 11, and a bracket 16 provided on one side of the workbench 14. Such bracket 16 being adapted to receive the adjustable protruding members 15.

The base member 11 is also provided with a handle 17 connected to a jacking mechanism, or a rack and pinion mechanism. By turning the handle 17 in opposite directions, the support pillar 13 can be raised or lowered within the base member 11, thereby raising and lowering the guidance rail 12. In certain applications, that is, where it is desired to clamp a workpiece 24 in a desired position relative to the guidance rail 12, the workpiece 24 can be positioned between the guidance rail 12 and the top surface of the workbench 14 and the guidance rail 12 can be lowered by turning the handle 17. By doing so, the workpiece 24 is clamped between the undersurface of the guidance rail 12 and the top surface of the workbench 14.

Additionally, the base member 11 may also be provided with securing means 23, preferably ,a threaded bolt or screw member, which passes through a threaded aperture provided in a side of the base member 11 and which can engage a surface of the support pillar 13, located within the base member 11. Such securing means 23, in use, and in addition to the jacking or rack and pinion mechanism, assists with maintaining the guidance rail 12 at a desired position in relation to the workpiece 24 located on the workbench 14.

The base member 11 is also provided with a reference plate 18. Such reference plate 18 assists in positioning the workpiece 24 at a desired orientation or alignment in relation to the guidance rail 12.

Figure 2:
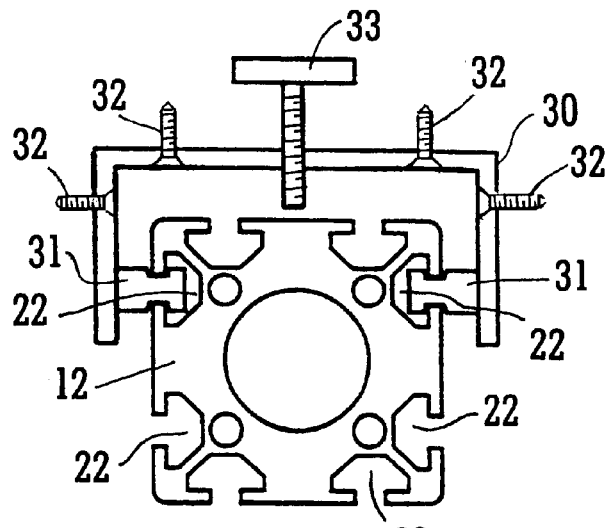
FIG. 2 shows, in section, a preferred form of the guidance member with one embodiment of a first carrier member located thereon.

As illustrated in FIGS. 1 and 2, the surface of each side of the guidance rail 12 is provided with two channels 22 along the length thereof. Preferably, such channels 22 are symmetrically positioned relative to the central axis of the guidance rail 12. The channels 22 act as guides along which carrier members 30, 40 may move.

As illustrated in FIG. 2, one embodiment of a carrier member 30 upon which a tool holder may be mounted, for example, a saw or drill holder, is substantially U-shaped in cross section, and is provided on an inner surface thereof with protruding members 31 which are adapted to be received by, and retained within, channels 22 provided on opposite sides of the guidance rail 12. Preferably, such protruding members 31 are made of a material of low friction such that the carrier member 30 can move easily within said channels 22, along the length of the guidance rail 12, and are of a suitable profile such that there is minimal lateral movement of the carrier member 30 when received by the channels 22.

Further, the carrier member 30 is provided with attachment means 32 which enable the carrier member 30 to be attached to a tool holder, for example, a saw 60 or drill 80 holder. As illustrated, such attachment means 32 comprise a plurality of protruding threaded members located on the outer surface of the carrier member 30.

The carrier member 30 is also provided with securing means 33 such that the carrier member 30 can be secured at any desired location along the length of the guidance rail 12. In the illustrated embodiment, such securing means 33 comprise a threaded bolt or screw member which passes through a threaded aperture provided in a surface of the carrier member 30, and which can engage with a surface of the guidance rail 12. When the bolt or screw member engages with the surface of the guidance rail 12, and is sufficiently tightened, the carrier member 30 is secured in position. Preferably, the distance between the channels 22 provided on the surface of each side of the guidance rail 12 is large enough so that the securing means 33 can engage with a surface of the guidance rail 12 of sufficient area to prevent movement of the carrier member 30 when secured in a desired position by said securing means 33. A surface of the guidance rail 12 may also be graduated (see 19). This assists with locating the carrier member 30 at a specific location along the guidance rail 12. For example, if a hole is required to be drilled at a certain distance from the edge of the workpiece 24, such graduation assists in locating the carrier member 30 and the drill mounted thereon, at the desired distance from the edge of and above the workpiece 24.

Figure 3:
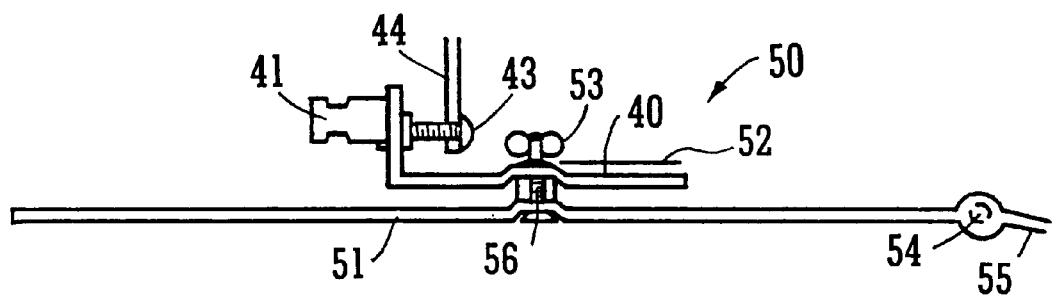
FIG. 3 shows, in section, a preferred embodiment of a second carrier member of the type suitable to carry a clamp or guide member.

As illustrated in FIG. 3, an embodiment of a carrier member 40 of the type suitable to carry a clamp or guide member 50 is substantially L-shaped in cross-section. Such carrier member 40 is provided on an outer surface thereof with a protruding member 41 which is adapted to be received by, and retained within, channels 22 provided on the sides of the guidance rail 12. Preferably, such protruding member 41 is made of a material of low friction such that the carrier member 40 can move easily within said channels 22, along the length of the guidance rail 12, and are of a suitable profile such that there is minimal lateral movement of the carrier member 40 when received by the channels 22.

The carrier member 40 is also provided with securing means 43 such that the carrier member 40 can be secured at any desired location along the length of the guidance rail 12. In the illustrated embodiment, such securing means 43 comprises a threaded bolt or screw member which passes through a threaded aperture provided in a surface of the carrier member 40, an end of which can engage with a surface of the guidance rail 12. When the bolt or screw member engages a surface of the guidance rail 12, and is sufficiently tightened, the carrier member 40 is secured in position. Preferably, the distance between the channels 22 provided on the surface of each side of the guidance rail 12 is large enough so that the securing means 43 can engage with a surface of the guidance rail 12 of sufficient area to prevent movement of the carrier member 40 when secured in a desired position by said securing means 43. As shown, and in order to assist with tightening the bolt or screw member to effect securement of the carrier 40, as well as assist with the untightening of the bolt or screw member to effect the release of the carrier 40, the bolt or screw member is provided with a lever 44 at one end thereof.

The carrier 40 of FIG. 3 is adapted to be connected to a clamp or guide member 50 which can be used to clamp or guide a workpiece 24. Member 50 comprises an elongate member 51 and a scale plate 52. The elongate member 51 is rotatably connected at 56 to the carrier 40 and can be secured at any desired angular orientation relative to the workpiece 24 by tightening screw 53. The elongate member 51 passes under the guidance rail 12. The scale plate 52 is provided with an angular scale on a surface thereof so that the elongate member 51 can be located at a specific angular orientation relative to the workpiece 24.

In a preferred embodiment, the elongate member 51 of the clamp or guide member 50 is provided with a hinge 54, adjacent one end thereof. This enables end 55 of the elongate member 51, in use, to make contact with a rectangular or tubular or irregularly shaped workpiece 24 and assists in clamping or guiding such shaped workpieces 24.

When member 50 is required to act as a clamp member, the carrier member 40 and its respective member 50 are moved along the guidance rail 12 until an edge of the elongate member 51 abuts against the edge of the workpiece 24 adjacent thereto. By tightening securing means 43, the workpiece 24 is clamped in a desired position. It is to be understood that depending on the required orientation of the workpiece 24 relative to the guidance rail 12, clamping may be effected by one of said members 50 and its respective carrier 40 located on one side of the workpiece 24, that is, in conjunction with the guidance rail 12 or the support pillar 13 and/or reference plate 18, or by a plurality of members 50 and their respective carriers 40 located at both sides of the workpiece 24, that is, either alone or in conjunction with the guidance rail 12.

When member 50 is required to act as a guide member, the carrier member 40 and its respective member 50 are moved along the guidance rail 12 until the edge of the elongate member 51 abuts against the edge of the workpiece 24 adjacent thereto, but not too strongly, so that movement of the workpiece 24 is restricted. By tightening securing means 43, elongate member 51 is located in a desired position. It is to be understood that depending on the required orientation of the workpiece 24 relative to the guidance rail 12, guidance of the workpiece 24 past the guidance rail 12 may be effected by one of said members 50 and its respective carrier 40 located at one side of the workpiece 24, that is, in conjunction with the support pillar 13 and/or with the reference plate 18, or by a plurality of members 50 and their respective carriers 40 located at both sides of the workpiece 24.

The skilled person will realise that since the elongate member 51 of the clamp or guide member 50 is rotatably connectable to its respective carrier member 40, the workpiece 24 can be clamped or guided by member/s 50 at any desired orientation in relation to the guidance rail 12, that is, depending on the type of work which needs to be carried out on the workpiece 24, for example, drilling or cutting.

Figure 4:
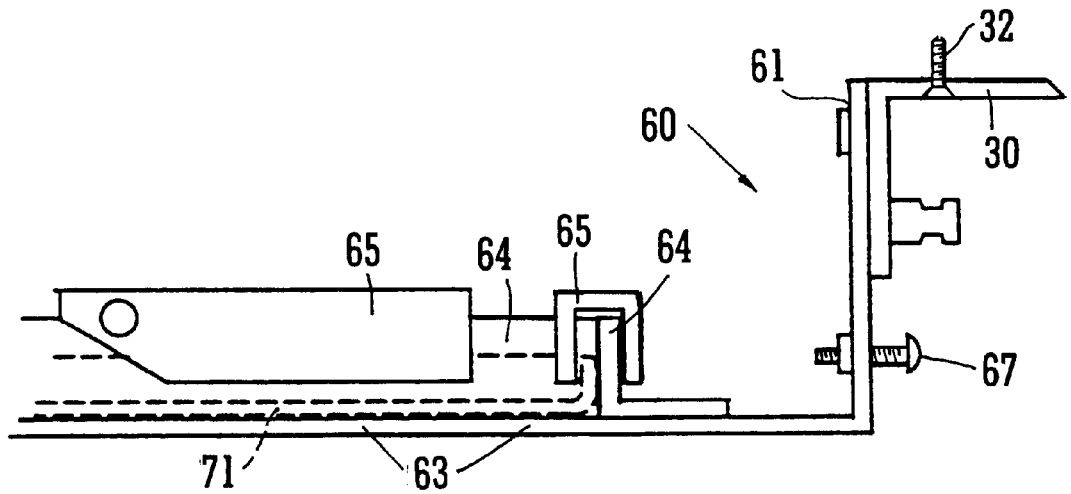
FIG. 4 shows, in section, a preferred embodiment of a saw holder.

As illustrated in FIG. 4, a saw holder 60 is attachable to a carrier 30 of the type shown in FIG. 2 via attachment means 32. Such attachment is effected by attachment means 32 of the carrier 30 passing through an aperture provided in side 61 of the saw holder 60, and being received by a nut 62, which when tightened, results in such attachment. As can be seen more clearly in either FIGS. 7 or 8, the saw holder 60 comprises a substantially L-shaped base 63 provided with a corresponding shaped wall 64. In a preferred embodiment, a circular saw 70 (shown in dotted lines) is attached via its rectangular base plate 71 (also shown in dotted lines) to the wall 64 provided on the base 63 of the saw holder 60. Such attachment is preferably effected by a plurality of clips 65 which are pivotally attached to the wall 64, and which pass over the wall 64 of the saw holder 60 and the raised end of the rectangular base plate 71 of the circular saw 70.

In a preferred embodiment, side 61 of the saw holder 60 is provided with an adjustable spacer member 67. In the illustrated embodiment, such adjustable spacer member 67 comprises a threaded bolt which passes through a threaded aperture provided in the side 61 of the saw holder 60. In use, the end of the bolt 67 is adjusted to abut against the adjacent surface of the guidance rail 12, thereby maintaining the saw holder 60 in a substantially horizontal position, even when the circular saw 70 is attached thereto. So that movement of the carrier member 30 along the guidance rail 12 is not hindered by the adjustable spacer 67 in use, same is preferably made of a low friction material.

Figure 7:
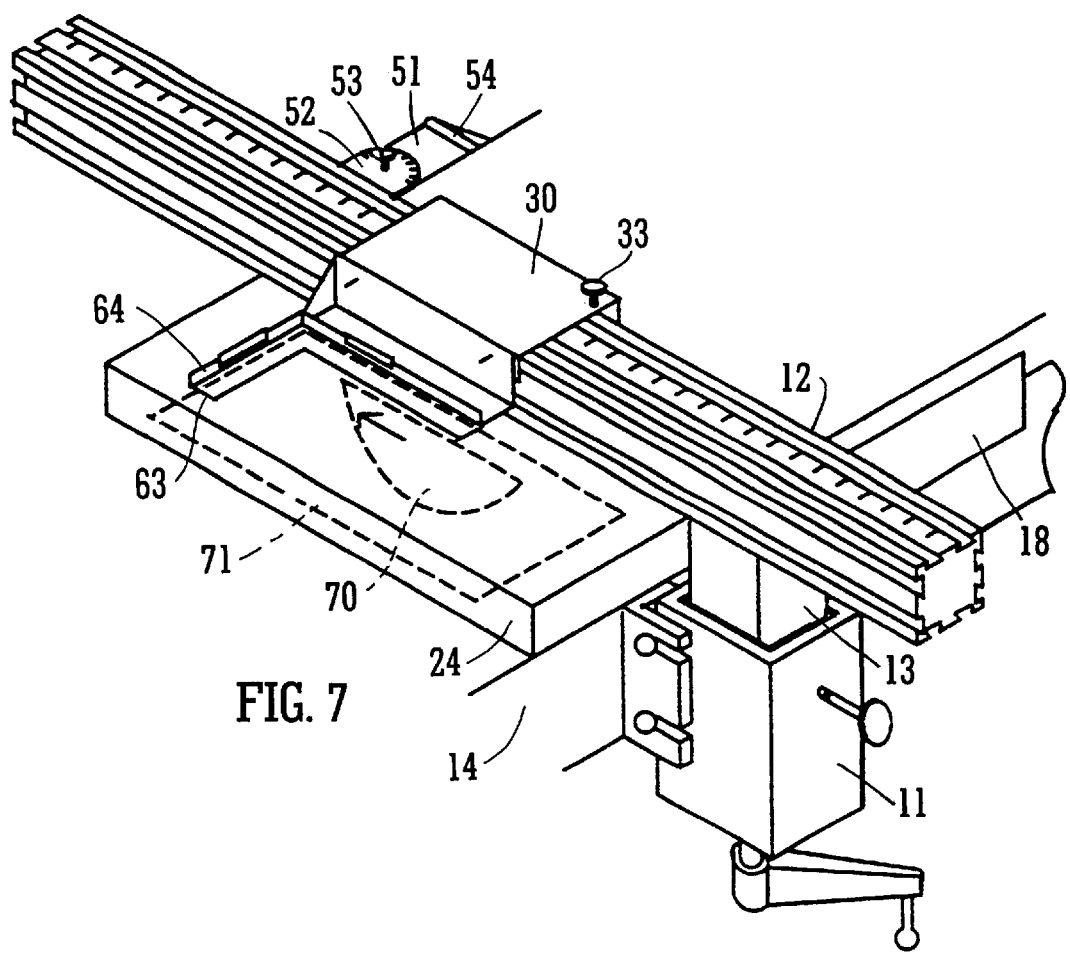
FIG. 7 shows, in perspective, an arrangement of assemblies for cross cutting.
Figure 8:
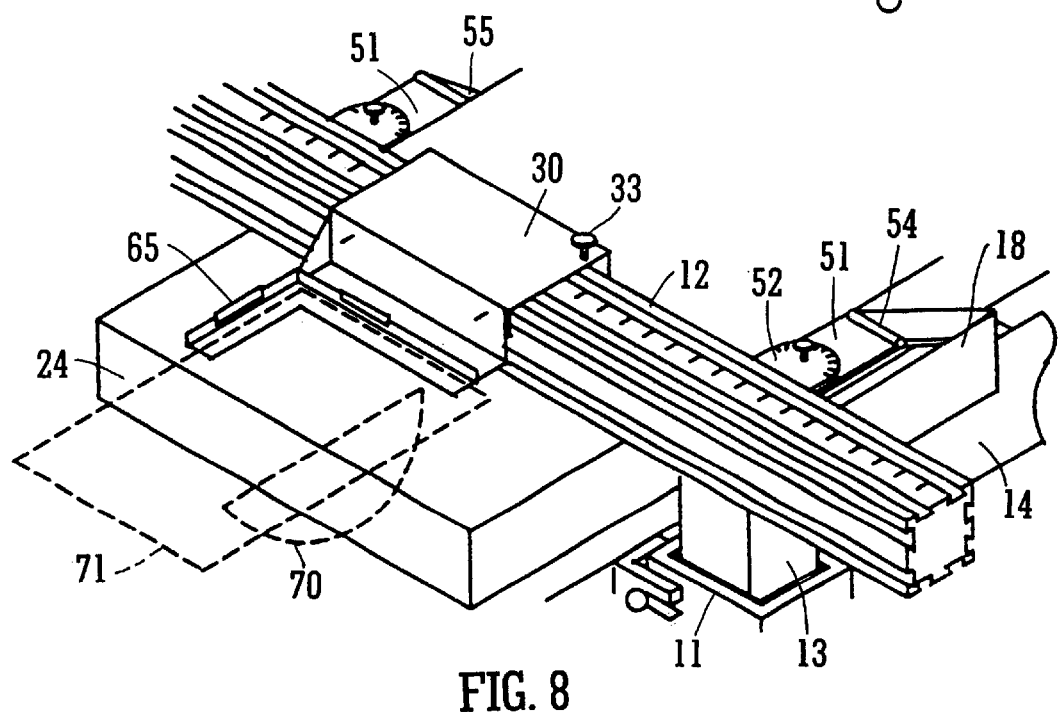
FIG. 8 shows, in perspective, an arrangement of assemblies for length cutting.

As shown in FIGS. 7 and 8, the circular saw 70 can be attached to the saw holder 60 such that the circular saw 70 is perpendicular, or parallel, to the guidance rail 12, that is, depending on which direction the workpiece 24 is to be cut.

Figure 5:
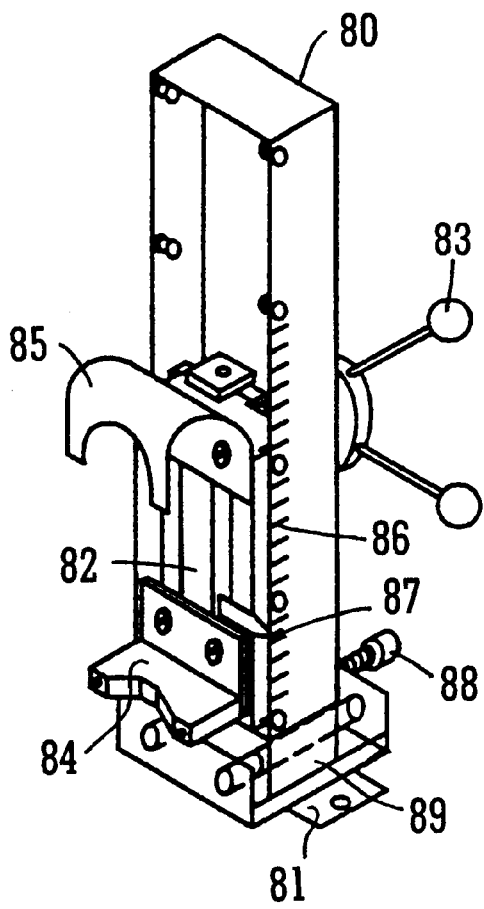
FIG. 5 shows, in perspective, a preferred embodiment of a drill holder.
Figure 6:
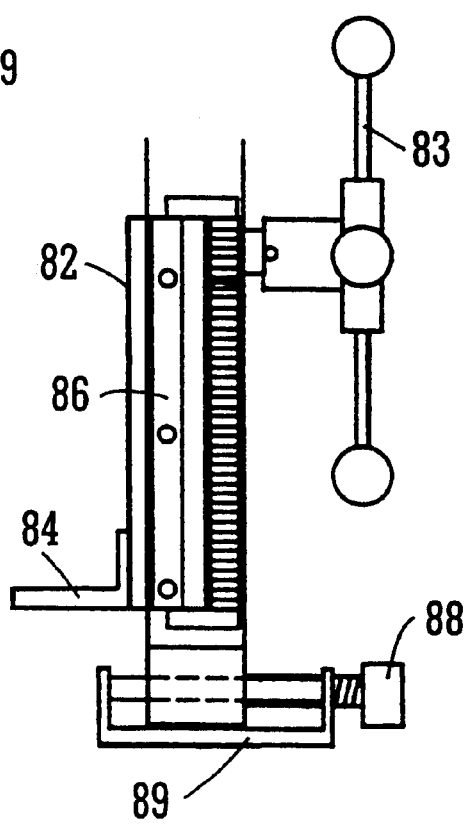
FIG. 6 shows, in section, a preferred embodiment of the drill holder.

As illustrated in FIGS. 5 and 6, a drill holder 80 comprises a base plate 81 which is attachable to the carrier member 30 of the type shown in FIG. 2 via the attachment means 32, that is, such attachment is effected when the attachment means 32 pass through the respective apertures provided on the base plate 81, and a nut is mounted thereon, and tightened.

The drill holder 80 comprises a drill receiving member 82 which is vertically displaceable within the drill holder 80 by rotating handle 83 which is connected to a rack and pinion mechanism. Preferably, the drill receiving member 82 comprises a lower clamp 84 and an upper clamp 85. The lower clamp 84 clamps around the collar part of the drill situated directly behind the drill's chuck. Further preferably, the lower clamp 84 is a split hexagonal ring type clamp which can accommodate a large range of drill collar sizes. The upper clamp 85 clamps around the rear part of the body of the drill in the region of the drill armature rear bearing. Additionally, the positioning of the upper clamp 85 relative to the lower clamp is adjustable so that the drill holder 80 can accommodate a range of drills having different body lengths.

In a preferred embodiment, a side 86 of the drill holder is graduated and the drill receiving member 82 is provided with a protruding member 87 which acts a pointer, such that the vertical displacement of the drill and its respective drill bit can be measured.

Additionally, the drill holder 80 is mounted within a base 89 in such a manner that same is horizontally displaceable within the base 89. This enables the drill bit of the drill, when received by the drill receiving member 82, to be horizontally displaceable in relation to the workpiece 24.

Furthermore, and in a preferred embodiment (not shown), the base 89 is rotatably mounted on the drill holder base plate 81 such that the drill bit can be positioned to provide a hole in a workpiece 24 at any angle i.e. a drill when mounted on the drill holder 80 is not just capable of providing a hole which is substantially vertical in relation to the surface of the workpiece 24.

Although the present invention has been described by way of example to a guidance apparatus suitable to guide a saw and/or a drill, it is to be understood that same can be used to guide any tool which is required to carry out an action on a workpiece or object. Additionally, it is to be understood that the guidance apparatus of the present invention can be attached to any support structure upon which a workpiece can be located so that work can be carried out thereon.

Whilst certain preferred embodiments of the present invention have been disclosed in detail, it is to be understood that various modifications may be adopted without departing from the spirit of the invention, or the scope of the following claims.

What is claimed is:

1. A guidance apparatus which, in use, is attached to a workbench, characterised in that the guidance apparatus comprises a cantilevered guidance member having a single substantially vertically disposed support member, and at least one first carrier member which moves along the length of the guidance member and which carries at least two different tool holders separately.

2. A guidance apparatus as claimed in claim 1, further characterised in that the guidance member is vertically displaceable relative to the workbench and acts as a clamp which can clamp a workpiece between the guidance member and the workbench.

3. A guidance apparatus as claimed in claim 1, further characterised in that at least one surface of the guidance member graduated.

4. A guidance apparatus as claimed in claim 1, further characterised in that the guidance apparatus further comprises at least one second carrier member which is moveable along the length of the guidance member and which carries a clamp or guide member.

5. A guidance apparatus as claimed in claim 4, further characterised in that the clamp or guide member comprises an elongate member which is rotatably connected to the second carrier member.

6. A guidance apparatus as claimed in claim 5, further characterised in that the clamp or guide member is provided with an angular graduated scale plate thereby enabling the elongate member to be positioned at a specific angular orientation relative to the workpiece.

7. A guidance apparatus as claimed in claim 5, further characterised in that an end of the elongate member is provided with a hinged extension which, in use, clamps or guides a rectangular, tubular or irregular shaped workpiece.

8. A guidance apparatus as claimed in claim 1, further characterised in that the first carrier members are provided with securing means such that the carrier members are securable at any position along the length of the guidance member.

9. A guidance apparatus as claimed in claim 4, further characterised in that the second carrier members are provided with securing means and that the carrier members are securable at any position along the length of the guidance member.

* * * * *